(12) United States Patent
Pugach et al.

(10) Patent No.: US 8,106,910 B2
(45) Date of Patent: Jan. 31, 2012

(54) METHOD FOR CORRECT REPRODUCTION OF MOVING SPATIAL IMAGES ON A FLAT SCREEN

(76) Inventors: Vldimir Pugach, Mountain View, CA (US); Stanislav Klimenko, Protvino (RU); Polina Danilicheva, Yubileyny (RU)

( * ) Notice: Subject to any disclaimer, the term of this patent is extended or adjusted under 35 U.S.C. 154(b) by 976 days.

(21) Appl. No.: 12/079,448

(22) Filed: Mar. 28, 2008

(65) Prior Publication Data
US 2009/0244072 A1 Oct. 1, 2009

(51) Int. Cl.
*G06T 13/00* (2011.01)
(52) U.S. Cl. .......................................... 345/474; 345/473
(58) Field of Classification Search ........................ None
See application file for complete search history.

(56) References Cited

U.S. PATENT DOCUMENTS

| | | | |
|---|---|---|---|
| 4,131,342 A | 12/1978 | Dudley | |
| 5,751,927 A * | 5/1998 | Wason | 345/419 |
| 5,764,317 A | 6/1998 | Sadovnik et al. | |
| 6,054,999 A | 4/2000 | Strandberg | |
| 6,246,382 B1 * | 6/2001 | Maguire, Jr. | 345/8 |
| 6,559,845 B1 | 5/2003 | Harvill et al. | |
| 7,073,908 B1 * | 7/2006 | Provitola | 353/10 |
| 7,086,735 B1 * | 8/2006 | Provitola | 353/10 |
| 7,274,367 B2 | 9/2007 | Haratsch et al. | |
| 7,309,125 B2 | 12/2007 | Pugach | |
| 7,327,361 B2 | 2/2008 | Shimamura | |
| 7,545,405 B2 * | 6/2009 | Provitola | 348/42 |
| 7,612,795 B2 * | 11/2009 | Provitola | 348/42 |
| 2004/0189796 A1 * | 9/2004 | Ho et al. | 348/51 |
| 2006/0152803 A1 * | 7/2006 | Provitola | 359/462 |
| 2008/0024727 A1 * | 1/2008 | Provitola | 353/10 |
| 2008/0252718 A1 * | 10/2008 | Provitola | 348/42 |

OTHER PUBLICATIONS

Warren, W.H., and Hannon, D.J., 1990. Eye movements and optical flow. J. Opt. Soc Amer. vol. 7, No. 1, Jan. 1990, pp. 160-169.*
Rogers, Sheena and Rogers, Brian J., Visual and nonvisual information disambiguate surfaces specified by motion parallax, Perception & Psychophysics 1992, 52 (4). 446-452.*

* cited by examiner

*Primary Examiner* — Daniel Hajnik

(57) ABSTRACT

A method for correct reproduction of moving three-dimensional (3D) scenes observed by a viewer on displays showing moving three-dimensional scenes relating to video games, animated cartoons, simulators for drivers or pilots, etc. The main concept of the invention is the reproduction of a moving scene that rotates around a selected center, which is the point of the viewer's gaze fixation. Thus, all objects that are stationary with respect to each other on the illustrated scene rotate at the same angular speed but move on the screen at different linear speeds, which are inversely proportional to preselected distances from the viewer to the respective objects. Movements of objects relative to each other are presented in a coordinate system rotating with the scene. For reproduction on the display, distances to the objects, number of objects, and other selected data are entered into a conventional 3D-animation computer program.

20 Claims, 6 Drawing Sheets

METHOD FOR CORRECT REPRODUCTION OF MOVING SPATIAL IMAGES ON A FLAT SCREEN

FIELD OF THE INVENTION

The present invention relates to the field of perceptive psychology, psychophysiology, and neurophysiology of the brain, and may find application in devices for improving spatial perception. The invention also relates to a method for creating correct spatial images on flat screens of the aforementioned devices. For example, the principles of the invention may be used in creating animated cartoon films, video games, simulators for the training vehicle drivers, pilots, etc. Another application is training of individuals for improved perception of moving three-dimensional images on flat screens, e.g., on screens of video games or animated cartoons on the screens of cinema theaters.

BACKGROUND OF THE INVENTION

Known is the so-called Pulfrich effect according to which humans determine the distance between objects located in space because of binocular vision. However, this effect does not work for an image on a plane. When the image is limited by a screen, the Pulfrich effect can be obtained only with the use of special technical means such as a stereoscope.

Known in the art is "A Method and Apparatus for Detecting Abnormalities in Spatial Perception" issued in 2007 to V. Pugach, et al." (see U.S. Pat. No. 7,309,125 issued on Dec. 18, 2007), wherein an apparatus for detecting abnormalities in spatial perception consists of a first transparent screen in a close-vision field and a second screen seen through the first one and located in a far-vision field and wherein spatial perception of a person being tested is determined by tracking trajectories of the eye pupils when the person follows trajectories of a moving image on a selected screen.

Disadvantage of this known method is that anomalies in spatial perception are revealed in a static state of the space and that the depth of the spatial perception is a given value.

Another example of erroneous spatial perception of three-dimensional moving object on a flat screen is video games. Video games were first introduced in the 1970s. By the end of that decade they had become the preferred childhood leisure activity, and adults responded with concern about the possible ill effects of the games on children. Early research on these effects was inconclusive. However, a resurgence in video game sales that began in the late 1980s after the introduction of the Nintendo system has renewed interest in examining the effects of video games. Statistics show that at the present time children between the ages of seven and 17 play for an average of eight hours a week. Most of the games on the market are appropriate for these young players, and the best of these games can bring a lot of benefits. However, in addition to the fact that some of the video games create problems associated with violence (shows killing of people or animals, use and abuse of drugs and alcohol, etc.), they generate habits of erroneous perception of moving three-dimensional objects on a flat screen, and this may lead to undesirable consequences. More specifically, the existing animated cartoons films and video games are created on the principle of static perspective, which is incorrect because in reality an observer sees moving objects differently, i.e., as turning and passing by.

The inventors believe that a person who spends many years on such incorrectly reproduced video games such as those showing a vehicle being driven by using a steering wheel of a simulator and observing the situation on a flat screen, a young or woman sit into a real vehicle, he/she is more often subject to accidents when driving an actual vehicle because of having acquired driving habits based on incorrect spatial perception observed on a flat screen. Also, there are no three-dimensional animated cartoons that correctly reproduce special arrangement of moving objects on a screen.

In general, animation is the rapid display of a sequence of images of two- or three-dimensional model positions in order to create an illusion of movement. Animation is an optical illusion of motion due to the phenomenon of persistence of vision, and can be created and demonstrated in a number of ways. The most common method of presenting animation is as a motion picture or video program, although several other forms of presenting animation also exist.

Known in the art are traditional animation and computer-based animation. Traditional animation can be divided into full animation with detailed drawings, limited animation that involves the use of less detailed and more stylized drawings and methods of movement, rotoscoping where animators trace live-action movement, frame by frame, stop-motion animation used to describe animation created by physically manipulating real-world objects and photographing them one frame of film at a time to create the illusion of movement, etc. The present invention relates to a method of computer animated methods where three-dimensional images of objects are created by reproducing images depicted from a plurality of sequentially arranged transparent media.

Computer animation can be created with a computer and animation software. Some examples of animation software are: Amorphium (can be acquired from IDG Communications Ltd., London), Art of Illusion (Free Software Foundation, Inc., Boston), Poser (SmithMicrosoftware, California), Ray Dream Studio (Fractal Design Corporation, California), Bryce (Ziff Davis Enterprise, New York), Maya (Autodesk, Inc., California), Blender (O'Railly, California), TrueSpace (Caligari Corporation, California), Lightwave (NewTek, Texas), 3D Studio Max (Fernando Sarmiento Graphic Design; address: info@supershareware.com<info@supershareware.com), SoftImage XSI (Avid Technology, Inc. Massachusetts). There are many more. Prices will vary greatly depending on the target market. Some impressive animation can be achieved even with basic programs; however, the rendering can be time consuming on a home computer. Because of this, video game animators tend to use low resolution, low-polygon-count rendering, such that the graphics can be rendered in real time on a home computer. Photorealistic animation would be impractical in this context.

Given below are some known inventions describing methods and devices used for visual perception of 2D-images as 3-D objects.

U.S. Pat. No. 4,131,342 issued in 1978 to L. Dudley describes an optical viewing system and method, the operating principles of which are based on two psychophysiological characteristics of the human visual system. One of these characteristics is the time delay between the arrival of a light stimulus or image on the retina of the eye and its recognition or interpretation at the visual cortex. The other characteristic is the non-achromatism of the eye. The first of these characteristics manifests itself in the so-called Pulfrich illusion, a moving object being apparently displaced from its actual path when viewed by an observer with a neutral filter in front of one eye because the differential visual time-lag results from the difference in brightness of the two retinal images. The second characteristic manifests itself in the so-called chromostereoscopic effect, which, under certain conditions, creates the illusion that differently colored objects, although actually at the same distance from an observer, are at differing distances from him.

U.S. Pat. No. 5,764,317 issued in 1998 to Lev Sadovnik, et al, discloses a 3-D volume visualization display that creates the illusion of seeing a volume image. The display comprises a volumetric multilayer screen that consists of a plurality of electrically switchable layers that are stacked and coextensive. Each of the plurality of electrically switchable layers includes: a first transparent dielectric substrate having a first side and a second side; a first transparent electrode coated on the first side of the first transparent substrate; and an electrically switchable polymer-dispersed liquid-crystal film coated on the first transparent electrode. The electrically switchable polymer-dispersed liquid-crystal film includes (a) a host polymer having an index of refraction, and (b) a nematic liquid crystal having (i) an ordinary index of refraction that substantially matches the index of refraction of the host polymer when an electric field is applied across the electrically switchable polymer-dispersed liquid-crystal film from the first transparent electrode, and (ii) an extraordinary index of refraction that causes visible light to be scattered at a host polymer/nematic liquid-crystal interface when the electric field is not applied across the electrically switchable polymer-dispersed liquid-crystal film by the first transparent electrode.

U.S. Pat. No. 6,054,999 issued in 2000 to O. Strandberg discloses a method for producing computer-processed animation that includes a workstation composed of a computer and peripheral equipment that produces a graphic movement sequence for a cartoon figure by compiling a recording of measured data from strategic parts of an actor and storing in memory information concerning the figure to be animated. The figure is divided into sections that are movable in relation to one another. Prior to figure compilation for producing an image of the figure, the measured data recording for each section is obtained in the form of a space angle. Prior to compiling each section, a grouping of a predetermined number of perspective drawings is stored, in digitized form, in the respective area of memory, each grouping being placed in a plurality of mutually different space angle positions. A memory area of interest representing a perspective drawing of one of the sections can be addressed with the aid of information relating to the space angle obtained from the measured data recording for the section concerned. The figure is compiled in the compilation image in accordance with a predetermined sequential compilation schedule, section by section, where each subsequent section is added to the nearest preceding section at a joint location in order to build the sections.

U.S. Pat. No. 7,327,361 issued in 2008 to T. Shamamura discloses a video game apparatus used as a three-dimensional imaging apparatus that includes a CPU. The CPU works together with a GPU to generate and display an image. More specifically, some objects are arranged in a virtual, three-dimensional space. The virtual, three-dimensional space is converted into a viewpoint coordinate and then is projected and converted. After projection conversion, determination points are set corresponding to a specific object, and the degree to which the specific object is hidden is calculated on the basis of the Z value of the specific object and the Z values of the determination points. At least one aspect of the display can be changed according to the degree to which the specific object is hidden.

However, none of the aforementioned devices and methods can correctly reproduce a moving spatial image on actual or virtual and sequentially arranged transparent media so that these images can be visually perceived as substantially three-dimensional.

OBJECTS AND SUMMARY OF THE INVENTION

It is an object of the present invention to provide a method for correct reproduction of a moving spatial image on a flat screen. It is a further object to provide a method for computer-assisted production of animated cartoons, videogames, etc. with enhanced three-dimensional features for improved visual perception of 2D pictures as 3D images. A still further object is to provide a method for reproduction of moving flat-screen images with improved spatial perception in a simple way by inputting preselected data into a conventional 3D-animation software suitable for use on a conventional personal computer.

A method of the invention for correct reproduction of moving three-dimensional scenes on a flat screen consists of the following steps: preparing a scenario and plurality of pictures depicting a predetermined scene at various instants of time; selecting for each picture of the scene a plurality of objects according to the scenario; selecting for the aforementioned, predetermined scene a coordinate system X, Y, Z, where Z is the vertical axis, and X-Y axes form the horizontal plane; arranging the objects in the aforementioned scene; drawing ovals that pass through each selected object or several objects if they are located on the same oval, each oval representing a projection of a circle seen by the observer at an angle to the X-Y plane; selecting a scale for scaling the sizes of objects; selecting the position for a rotation nucleus, which is a point-of-gaze fixation on the X-Y plane; dividing the aforementioned area on the X-Y plane into a near-sight space, which is the space between the viewer and rotating nucleus, and a far-sight space, which is the space behind the rotating nucleus; determining distance R from the viewer to the objects; selecting the linear speed V of movement of the aforementioned moving three-dimensional scene on the screen; calculating the frequency of rotation $\omega$ for all ovals and hence for all objects on each oval according to formula $\omega=V/R$; introducing as input data into a conventional 3D-animation computer program the values of V, R, number of objects, positions of objects on the ovals, scale, and other selected values; and creating a film for reproducing a moving spatial image on a screen by creating a plurality of aforementioned pictures on the basis of input data.

DETAILED DESCRIPTION OF THE INVENTION

Figure 1:
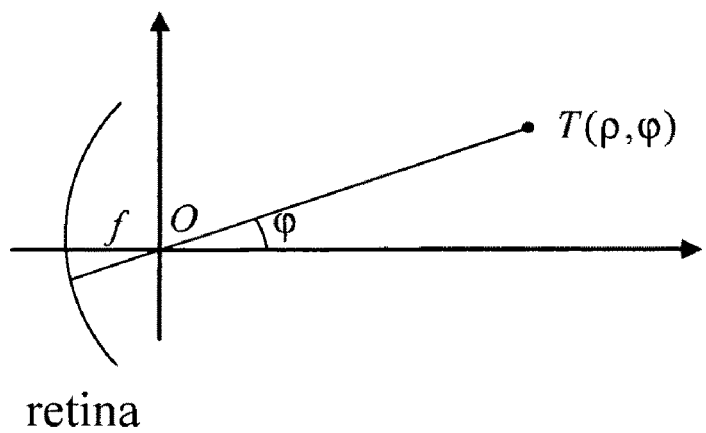
FIG. 1 shows position of a certain material point on a retina in polar coordinates $(\rho, \phi)$.

To better understand the principle of the present invention, it is advantageous to familiarize oneself with some observations and analyses conducted by the inventors.

To the observer there exists a near-sight perception space and a far-sight perception space, wherein the near-sight perception space rotates in a direction away from the observer, and the far-sight perception space rotates in a direction that coincides with the direction of movement of the observer. Both screens rotate, thus creating [an imaginary] spherical body that has an elliptical cross section with the center in the form of a rotation nucleus that moves linearly with respect to the observer. The depth of the image corresponds to the distance from the center of the sphere; the position of the near-sight screen equals the length of the radius from the rotation nucleus to the observer; the position of the far-sight screen equals the diameter of the sphere; and the distance from the observer to the center of rotation is calculated as a cotangent of a ratio of the distance from the observer to the sphere rotation center to the height of the observation point from the observation surface.

If the observer is inside the moveable image, the center of rotation moves linearly in the same direction as the observer. The near-sight screen moves together with the observer, while in the course of movement the far-sight screen describes a regular-shaped sphere. The center of the sphere and the position of the observer coincide, while the distance from the observer to the far-sight screen is calculated as a tangent of a ratio of the distance from the observer to the sphere rotation center to the height of the observation point from the observation surface.

The invention is based on the common knowledge in the field of human physiology and on the inventors' observations that in the visual perception each individual uses the close-vision field and the far-vision field, which exist irrespective of our consciousness. For example, when an individual is reading a book or looking at a computer keyboard, he/she uses the close-vision field. The inventors have found that in an adult person on average the close-vision field is located at a distance of up to 30-60 cm from the observer's eye, and the center of the close-vision field is generally below the horizontal plane passing through the viewer's eye pupil, e.g., 15° to 17° below the aforementioned horizontal plane. The far-vision field is extended from the close-vision field to infinity, i.e., at an angle 7.5° to 9.5° above or below the line of horizon to infinity.

Examples of the far-vision field are situations observed through the windshield by a driver when driving on a road, situations observed by a driver through the side window, conditions and position of a runway observed by a pilot during take-off and landing, etc.

Let us consider how an image of a material point is formed on a retina, how a person determines that the system of two material points rotates when he/she moves, and how he/she determines the direction of rotation. Although a viewer sees objects rotating along an oval trajectory, for convenience of consideration and derivation of the formulae, the following analysis will consider rotation along regular circles with affine transfer of the results from circles to real ovals.

Let us define, for this purpose, rotation of the observed objects in two cases:
  movement in the direction perpendicular to the direction of observation (e.g., observation through the side window of a bus); and
  movement in the direction that coincides with the direction of movement of the observer (e.g., through the windshield of the bus or airplane that flies in the direction at a certain angle to the horizon, e.g., during landing).

Let us consider a certain material point (FIG. 1), the position of which will be given in polar coordinates (($\rho, \phi$)). Let us further assume that the origin of coordinates is the optical center of the observer's eye; "f" designates the distance from the optical center to the retina which is equal to the focal distance. Then deviation of the material point on the retina can be represented as $y_i = f^*\phi$, and the velocity of movement of the material point image can be expressed as $v_i = f^*\dot\phi$.

Figure 2:
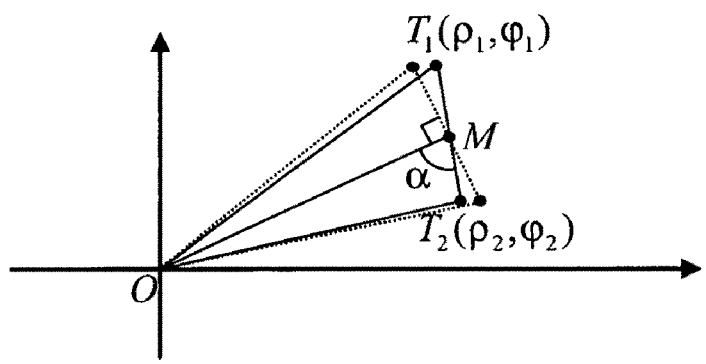
FIG. 2 is a picture that shows a system of two material points $T_1(\rho_1, \phi_1)$ and $T_2(\rho_2, \phi_2)$ in a polar coordinate system.

Using the example of a system of two material points $T_1$ ($\rho_1, \phi_1$) and $T_2$ ($\rho_2, \phi_2$) shown in FIG. 2, let us consider how a person determines that the material point system rotates. The points move relative to the origin of coordinates O with angular velocities $\dot\phi_1$ and $\dot\phi_2$, respectively. Let us consider difference $\dot\phi_1 - \dot\phi_2$. If this difference is greater than 0, then the angular dimensions of section $T_1T_2$ will increase, and if this difference is less than 0, then the angular dimensions of section $T_1T_2$ will decrease. The image size $T_1T_2$ on the retina will be respectively changed. Based on this, the person arrives at the conclusion about rotation of the object. It is understood that a mere increase in the angular dimension of an object is insufficient for judging about rotation of the object. For example, when we approach to the point of observation of a section perpendicular to the observation direction, the angular dimensions of this section increases even if rotation is absent. In order to determine whether or not this change is caused by rotation, it is necessary to know the distances to the aforementioned material points.

To carry out an imaginary experiment: assume that two point of light sources (in this case we consider that for the observer the brightness does not depend on the distance) are secured to a ring that rotates around its vertical axis of symmetry and is located at the level of the observer's eyes. If we ask the observer to close one eye, he/she will see two points that either approach each other or move away from each other. Thus, in order to become aware of the rotation, it is not enough to observe merely the change in angular distance between the points, it also necessary to know which point is closer to the observer and which point is farther from the observer.

To visually evaluate distances to objects, one can use many different mechanisms. The main mechanism is a binocular vision. However, such evaluation is possible also with a monocular vision, e.g., due to change in accommodation of the eye lens, which we feel as change in muscle tension.

To determine direction of rotation when the angular distance between two points is changed, let us consider the system of two material points.

Point $T_1$ is located farther from the observer than point $T_2$ ($\rho_1 > \rho_2$), and point M is in the middle of section $T_1T_2$. Since ($\rho_1 > \rho_2$), angle $\alpha$ is an acute angle. Let section $T_1T_2$ rotate relative to point V. It is understood that $T_1T_2$ have the maximum angular dimension when OM $\perp$ $T_1T_2$. This means that when acute angle $\alpha$ grows to 90° (with rotation in the counterclockwise direction), the angular dimension of $T_1T_2$ will increase. Then distances $\rho_1$ and $\rho_2$ will become equal (at $\alpha = 90°$). With further rotation in the counterclockwise direction, the condition of $\rho_1 < \rho_2$ occurs, and the angular dimension of $T_1T_2$ will decrease. Now, we can formulate the condition of rotation of a material-point system in the counterclockwise direction as follows:

$$\begin{cases} \dot{\phi}_1 - \dot{\phi}_2 < 0, \\ \rho_1 < \rho_2, \end{cases} \quad (1)$$

$$\begin{cases} \dot{\phi}_1 - \dot{\phi}_2 > 0, \\ \rho_1 > \rho_2, \end{cases} \quad (2)$$

Similarly, rotation in the clockwise direction can be formulated as follows:

$$\begin{cases} \dot{\phi}_1 - \dot{\phi}_2 < 0, \\ \rho_1 > \rho_2, \end{cases} \quad (3)$$

$$\begin{cases} \dot{\phi}_1 - \dot{\phi}_2 > 0, \\ \rho_1 < \rho_2. \end{cases} \quad (4)$$

Let us now consider movement of the observer perpendicular to the direction of observation (e.g., observation through the side window of the bus).

Figure 3:
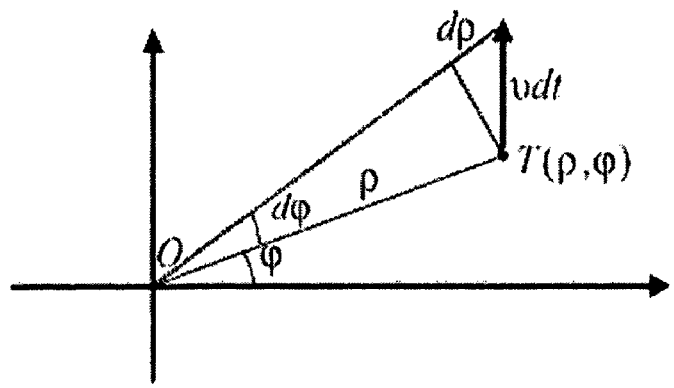
FIG. 3 is a graph illustrating movement of a material point in polar coordinates with a speed $\vec{v}=-\vec{u}$.

In order to simplify the model and make it more descriptive, let us consider a two-dimensional case (wherein height is not a factor). Let the bus moves with certain speed $\vec{u}$ in the direction parallel to axis y. Let us transfer to a calculation system where the observer is at rest, while the surrounding objects move with speed $\vec{v} = -\vec{u}$ (FIG. 3). Then the following can be written for incrementing the distance to the point of observation:

$$d\rho = v^* dt^* \sin\phi, \quad (5)$$

$$\dot{\rho} = v^* \sin\phi. \quad (6)$$

Incrementing of angle $\phi$ can be expressed as follows:

$$d\varphi = \frac{d\rho * \varphi}{\rho}, \quad (7)$$

$$\dot{\varphi} = \frac{v * \cos\varphi}{\rho}. \quad (8)$$

For points $T_1(\rho_1, \phi_1)$ and $T_2(\rho_2, \phi_2)$, change in the angular dimension of section $T_1T_2$ is expressed as follows:

$$\dot{\phi}_1 - \dot{\phi}_2 = v * \left( \frac{\cos\varphi_1}{\rho_1} - \frac{\cos\varphi_2}{\rho_2} \right). \quad (9)$$

Let us use the earlier formulated conditions (1) to (4) for rotation of section $T_1T_2$ in the counterclockwise direction. According to formula (9), the first condition $\dot{\phi}_1 - \dot{\phi}_2 = 0$ can be expressed as follows:

$$\frac{\cos\varphi_1}{\rho_1} = \frac{\cos\varphi_2}{\rho_2}. \quad (10)$$

Let us fix point $T_1$ and determine the rotation direction of section $T_1T_2$ for each position of point $T_2$. Since point $T_1$ is fixed, then the following can be written:

$$\frac{\rho_1}{\cos\varphi_1} = c,$$

where c is a certain constant. Since we consider only condition $\phi_1 \in [-\pi/2; \pi/2]$ (i.e., the viewer does not see anything behind him/her), then $c \geq 0$. In this case, equation (10) gives a plurality of points $T_2$:

$$\rho_2 = c * \cos\phi_2. \quad (11)$$

This corresponds to a circle of radius c/2 with the center in point (c/2, 0). Let us designate this circle as $O_1$. Condition $\dot{\phi}_1 - \dot{\phi}_2 > 0$ defines an area external to circle $O_1$, while condition $\dot{\phi}_1 - \dot{\phi}_2 < 0$ defines an area inside circle $O_1$.

Let us consider the second condition in the systems (1) to (4). When point $T_1$ is fixed, equation $\rho_1 = \rho_2$ gives us circle $O_2$ with the center in point (0, 0) and with radius $\rho_1$. In this case, condition $\rho_1 < \rho_2$ will correspond to the area outside circle $O_2$, while condition $\rho_1 > \rho_2$ will correspond to the area inside the aforementioned circle. Both circles $O_1$ and $O_2$ intersect at point $T_1$, as well as at a point symmetrical to point $T_1$ relative to the abscissa axis.

Thus, the system of points $T_1$ and $T_2$ will rotate in the counterclockwise direction if point $T_2$ belongs to:
1) the area internal with respect to circle $O_1$ and external with respect to circle $O_2$;
2) the area external with respect to circle $O_1$ and internal with respect to circle $O_2$.

The system of points $T_1$ and $T_2$ will rotate in the clockwise direction, if point $T_2$ belongs to:
1) the area internal with respect to circle $O_1$ and internal with respect to circle $O_2$;
2) the area external with respect to circle $O_1$ and external with respect to circle $O_2$.

Figure 4:
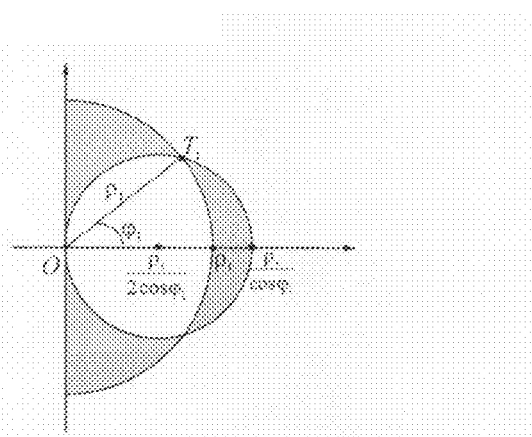
FIG. 4 shows dependence of direction of rotation of a section $T_1T_2$ on the position of points $T_2$ where the hatched area corresponds to rotation in the counterclockwise direction, while the non-hatched area corresponds to rotation in the clockwise direction.

In FIG. 4, the hatched area shows locations of points $T_2$ that occur when rotation is carried out in the counterclockwise direction, while the non-hatched area corresponds to rotation in the clockwise direction.

The above-described scenario presents interest for small angles $\phi_1$, $\phi_2$, since in order to observe objects located at large angles, the viewer has to turn his/her head. Furthermore, difference $\phi_1 - \phi_2$ should be small (not more than 7.5° to 9.5°). This condition is needed for distinctly observing two different points at the same time.

Figure 5:
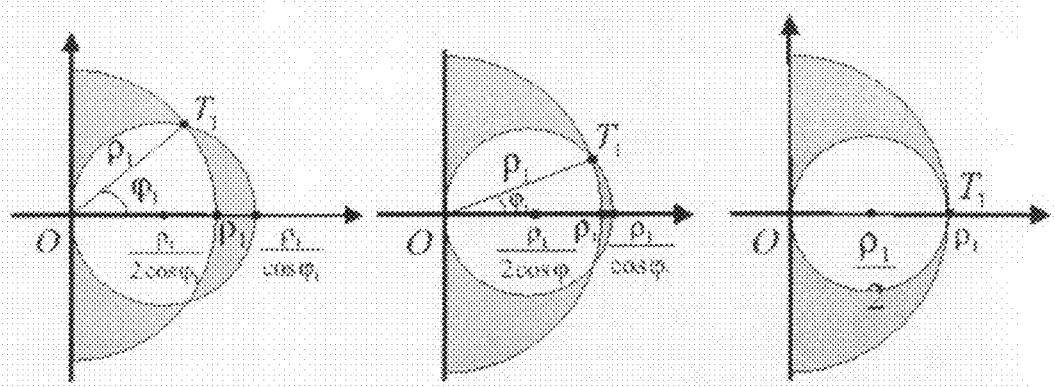
FIG. 5 is a graph that illustrates the effect caused by changes in the value of $\phi_1$, where $\phi_1$ is an angular polar coordinate of point $T_1$.

Now, it will be interesting to investigate how changes in the position of point $T_1$ affect the above-described picture. A change of $\rho_1$ changes the scale of the picture. However, it is more interesting to consider the effect caused by changes in the value of $\phi_1$. The pictures for various $\phi_1$ are shown in FIG. 5.

On the left side of the viewer, the object looks like it is rotating in the clockwise direction, which can be easily observed in reality (e.g., when looking through the left bus window). However, on the right side, the viewer will see objects as if they rotate in the counterclockwise direction. This condition can be noticed in the system for two vertical linear objects (e.g., two poles) rather than for elongated horizontal objects.

The above-described phenomenon is closely related to the phenomenon of monocular parallax motion (this phenomenon is sometimes called "temporal parallax"), which is one of the factors of monocular stereo effect that occurs, e.g., when a video camera of the observer is moved perpendicular to the direction of shooting (i.e., observation). In this case, the stereo effect is based on the fact that points located closer to or farther from the point of gaze fixation have angular velocities different with respect to the observer. The observer can judge the remoteness of objects based on the differences between their angular velocities.

In fact, this is a specific case of the problem: if a straight line is drawn from the point of observation (the point of gaze fixation), then all points on this line which are closer [to the observer] from the gaze fixation point will move with greater angular velocity, while all points that are farther from the point of gaze fixation will move with lower angular velocity. An object arranged on the axis that passes through the point of observation will always rotate in the clockwise direction (if the speed is directed as shown in FIG. 3). In a general case, however, the objects, which have a predetermined arrangement, may rotate in the counterclockwise direction, as shown in FIGS. 4 and 5.

Figure 6:
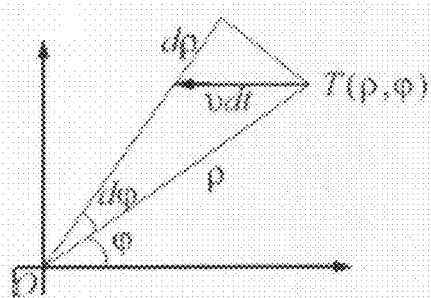
FIG. 6 is a picture similar to that shown in FIG. 3, except that speed will be directed along the abscissa axis.

Let us consider a case of observation through the windshield of a plane flying at a certain angle to the horizon. Let us consider rotation of objects around the horizontal axis perpendicular to the direction of movement. Let us restrict the consideration by a two-dimensional case, i.e., in a plane that passes through the direction of movement and perpendicular to the rotational axis, which is the subject of consideration (i.e., we consider only those objects that are seen directly along the course of the plane). Let us assume a counting system wherein the plane is at rest while the surrounding objects move toward the plane with speed $\vec{v}$. Furthermore, we will turn the calculation system so that the vector of speed $\vec{v}$ assumes a horizontal position. In this case, we obtain a picture similar to that shown in FIG. 3, except that speed will be directed along the abscissa axis (see FIG. 6).

Figure 7:
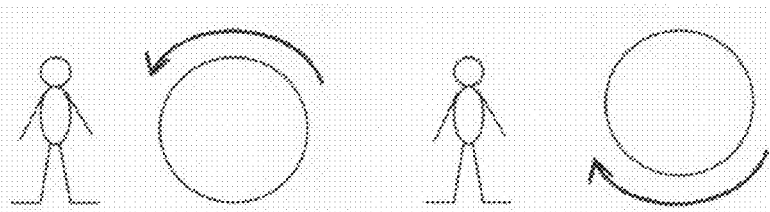
FIG. 7 shows direction of rotation seen by the observer.

Then rotation in the clockwise direction means that the uppermost point of the object rotates toward us while the lowermost point of the object rotates in the opposite direction. Rotation in the counterclockwise direction means that the uppermost point of the object rotates away from us while the lowermost point of the object rotates toward us (FIG. 7). Analogously with the above-described consideration, incrementing of distance to the point of observation is expressed as follows:

$$d\rho = -v * dt * \cos\phi, \quad (12)$$

$$\dot{\rho} = -v * \cos\phi. \quad (13)$$

The incrementing of angle $\phi$ is expressed as follows:

$$d\varphi = \frac{v * dt * \sin\varphi}{\rho}, \quad (14)$$

$$\dot{\varphi} = \frac{v * \sin\varphi}{\rho}. \quad (15)$$

Let us consider points $T_1(\rho_1, \phi_1)$ and $T_2(\rho_2, \phi_2)$. A change in the angular dimension of section $T_1T_2$ can be expressed by the following formula:

$$\dot{\varphi}_1 - \dot{\varphi}_2 = v * \left(\frac{\sin\varphi_1}{\rho_1} - \frac{\sin\varphi_2}{\rho_2}\right). \quad (16)$$

Direction of rotation will be determined according to conditions of formulae (1) to (4).

Let us consider condition $\dot{\phi}_1 - \dot{\phi}_2 = 0$. According to formula (16), this condition can be represented by the following equation:

$$\frac{\sin\varphi_1}{\rho_1} = \frac{\sin\varphi_2}{\rho_2}. \quad (17)$$

Let us fix point $T_1$ and determine the direction of rotation of $T_1T_2$ for each position of $T_2$. Since point $T_1$ is fixed, the following can be written: $\rho_1/\sin\phi_1 = c$, where c is a certain constant. In this particular case we must consider $\phi_1 \in [-\pi/2; \pi/2]$ (the observer does not see objects behind him/her). The following three versions are possible:

1. $\phi_1 \in (0; \pi/2]; c \geq 0;$

2. $\phi_1 \in [-\pi/2; 0); c \leq 0$

3. $\phi_1 = 0.$

Considering the first version, one fixed point $T_1$ (17) may correspond to a plurality of points $T_2$, as follows:

$$\rho_2 = c * \sin\phi_2. \quad (18)$$

This is a circle (in polar coordinates) with the center in point $(c/2, \pi/2)$ and with radius $c/2$. Let us designate this circle as $O_1$. Condition $\dot{\phi}_1 - \dot{\phi}_2 > 0$ corresponds to the external area with respect to circle $O_1$, while condition $\dot{\phi}_1 - \dot{\phi}_2 < 0$ corresponds to the internal area.

Let us consider the second version in the systems of formulae (1) to (4). When point $T_1$ is fixed, equation $\rho_1 = \rho_2$ corresponds to circle $O_2$ with the center in point $(0, 0)$ and with radius $\rho_1$. Condition $\rho_1 < \rho_2$ corresponds to the external area relative to circle $O_2$ while condition $\rho_1 > \rho_2$ corresponds to the internal area.

Circles $O_1$ and $O_2$ intersect at point $T_1$, as well as at a point symmetric to point $T_1$ relative to the axis of coordinates (this point, however, is out of our range of interests).

The system of points $T_1$ and $T_2$ will rotate in the counterclockwise direction if point $T_2$ belongs to:
 (1) internal area with respect to $O_1$ and external with respect to $O_2$;
 (2) external area with respect to $O_1$ and internal with respect to $O_2$.

The system of points $T_1$ and $T_2$ will rotate in the clockwise direction if point $T_2$ belongs to:
 (1) internal area with respect to $O_1$ and internal with respect to $O_2$;
 (2) external area with respect to $O_1$ and external with respect to $O_2$.

Figure 8:
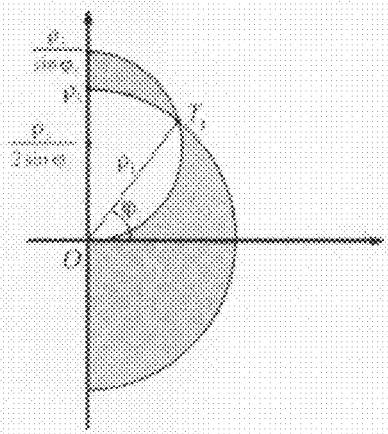
FIG. 8 shows dependence of direction of rotation of a section $T_1T_2$ on the position of points $T_1$ where the hatched area corresponds to rotation in the counterclockwise direction, while the non-hatched area corresponds to rotation in the clockwise direction (case $\phi_1 \in [-0; \pi/2]$).

In FIG. 8, the hatched area is the area of points $T_2$ that corresponds to rotation in the counterclockwise direction; the nonhatched area designates the area that corresponds to rotation in the clockwise direction.

Figure 9:
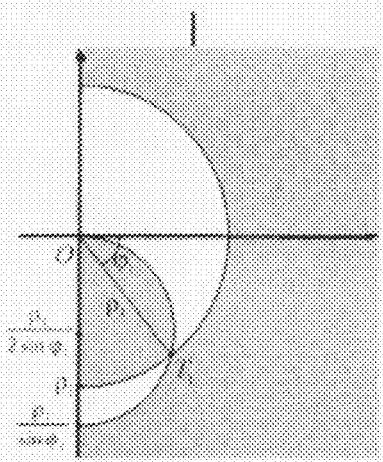
FIG. 9 shows dependence of direction of rotation of a section $T_1T_2$ on the position of points $T_1$ where the hatched area corresponds to rotation in the counterclockwise direction, while the non-hatched area corresponds to rotation in the clockwise direction (case $\phi_1 \in [\pi/2-0]$).
Figure 10:
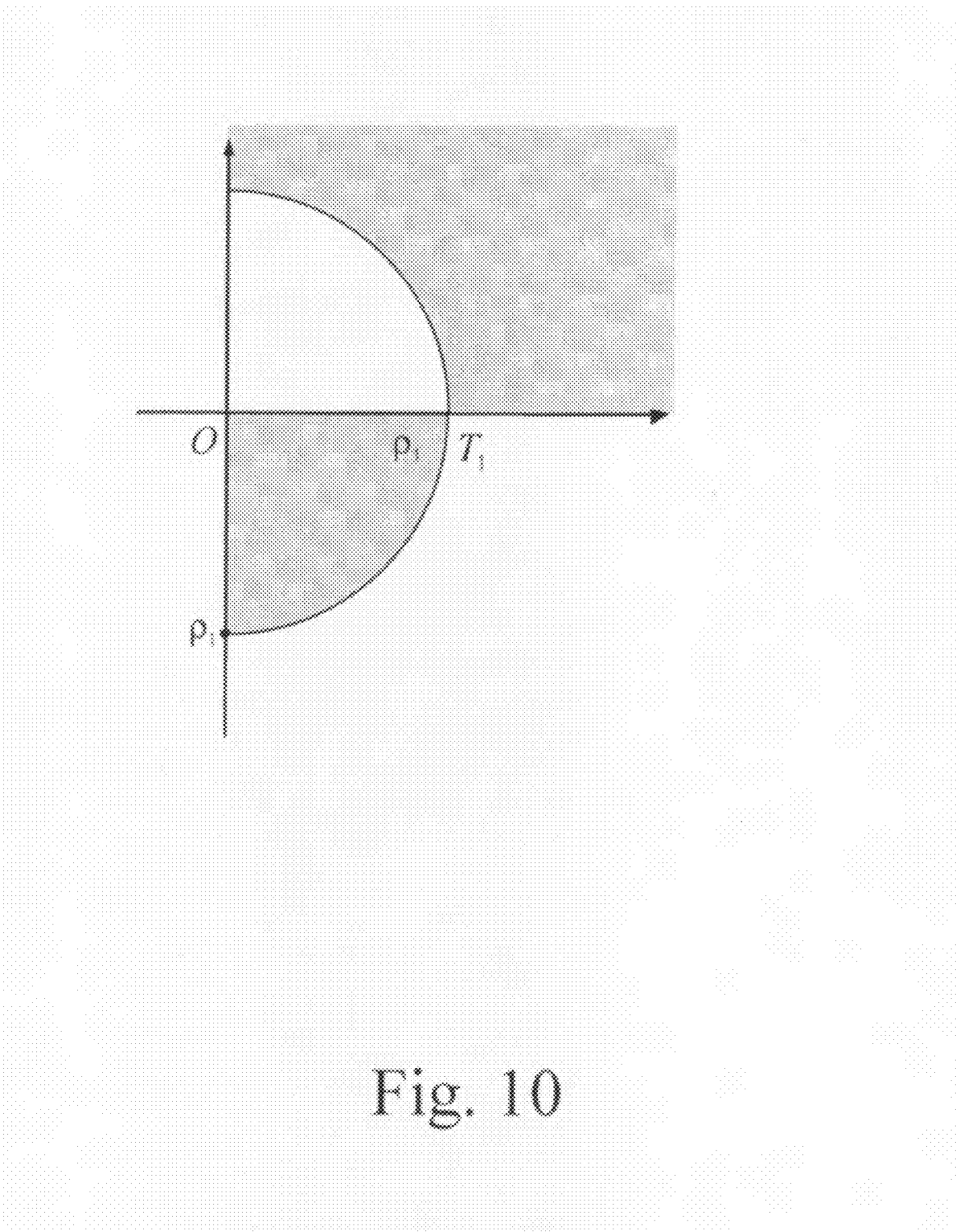
FIG. 10 shows dependence of direction of rotation of a section $T_1T_2$ on the position of points $T_1$ where the hatched area corresponds to rotation in the counterclockwise direction, while the non-hatched area corresponds to rotation in the clockwise direction (case $\phi_1 \in [\phi_1 = 0]$).

Considering the second version $\phi_1 \in [-\pi/2; 0)$ and taking into account the fact that condition $\dot{\phi}_1 - \dot{\phi}_2 > 0$ corresponds to the internal area with respect to circle $O_1$ (with the center in $(c/2, -\pi/2)$ and with radius $c/2$), we can obtain a relationship, as shown in FIG. 9. If $\phi_1=0$, we obtain $\dot\phi_1-\dot\phi_2>0$ at $\phi_2 \in [-\pi/2; 0)$ and $\dot\phi_1-\dot\phi_2<0$ at $\phi_2 \in (0; \pi/2)$. This condition is shown in FIG. 10. As in the previous case, this picture presents an interest for small values of angles $\phi_1$, $\phi_2$, since, in order to observe objects arranged at large angles, the observer has to turn his/her head. Furthermore, in order to observe two points at the same time, the difference $\phi_1-\phi_2$ also should be small (i.e., should not exceed 10°).

It should be noted that the above-described theory is applicable only to the case wherein a view-limiting frame is present between a viewer, who is moving (e.g., a driver or a passenger of a vehicle) and objects in a space being observed. More specifically, when under above the conditions a viewer observes a limited view of the scenery, e.g., through a window of a moving car, train, plane, etc., he/she will see objects in the foreground (i.e., objects between the viewer and the point-of-gaze fixation) passing by and turning in the counterclockwise direction in oncoming movement (i.e., in the direction opposite to movement of the vehicle) and objects on the background (i.e., the objects behind the point-of-gaze fixation in the gaze direction) passing by and turning in the counterclockwise direction but in the same direction as the direction of movement (if he/she is looking through the right-side window). Similarly, when under the above conditions a viewer observes a limited view of the scenery, e.g., through a window of a moving car, he/she will see objects in the foreground (i.e., objects between the viewer and the point-of-gaze fixation) passing by and turning in the clockwise direction in oncoming movement (i.e., in the direction opposite to the movement of the vehicle) and objects in the background (i.e., objects behind the point-of-gaze fixation in the gaze direction) passing by and turning in the clockwise direction but in the same direction as the direction of movement ((if he/she is looking through the left-side window).

Figure 11:
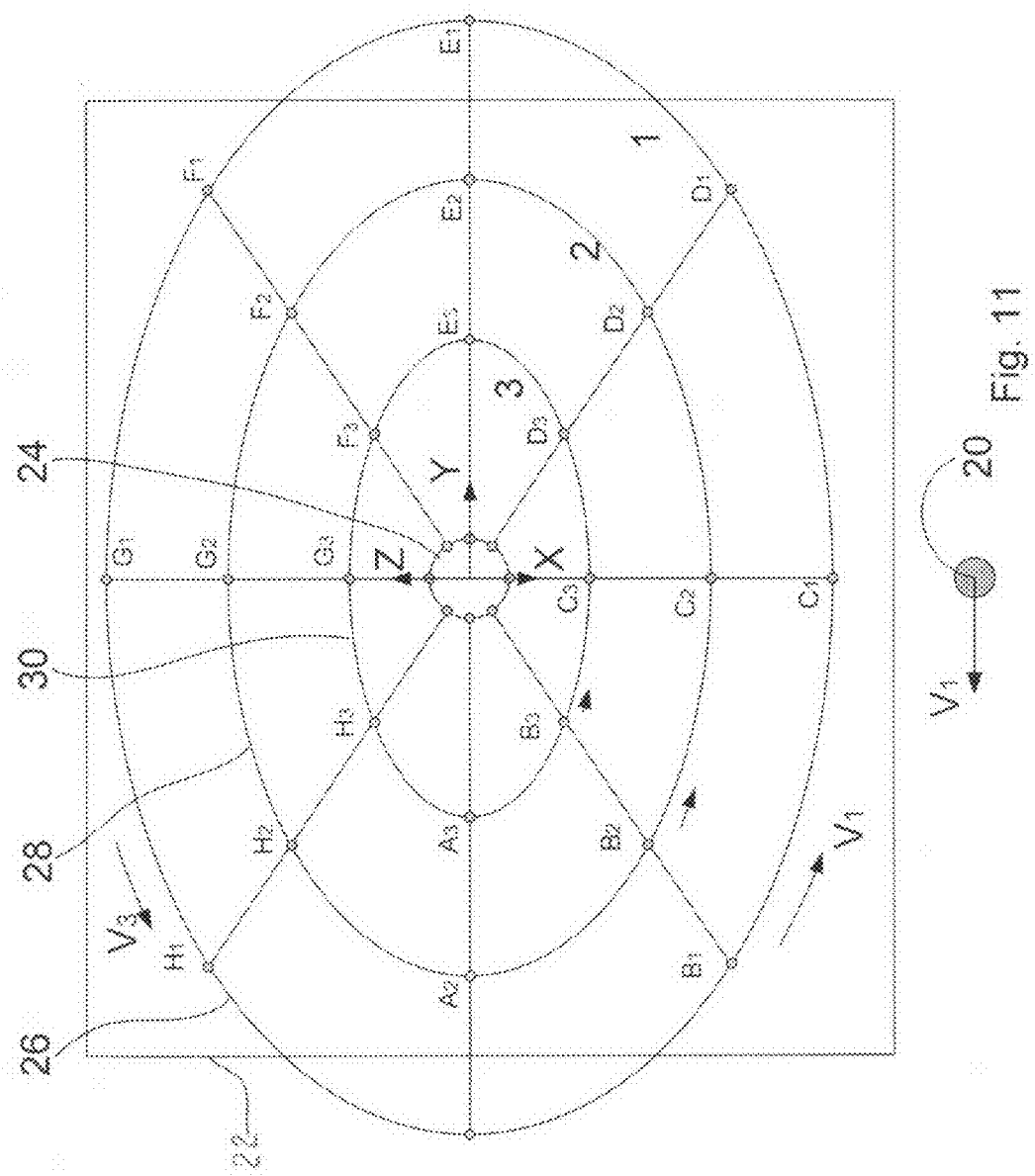
FIG. 11 is a schematic view that explains the principle of the present invention and illustrates a picture observed by a moving observer looking through a view-limiting object, e.g., a right car window.

In order to understand this concept, let us look at FIG. 11, which is a schematic of the view observed by a moving observer looking through a view-limiting object, e.g., a right car window. In this picture, the observer is designated by reference numeral 20. Let us assume that the observer 20 is observing a view seen through the right window of a moving car (not shown). The window frame of the car that limits the view is designated by reference numeral 22. The direction of movement of the car is shown by arrow V1. Reference numeral 24 designates the point-of-gaze fixation, which will be referred to as "rotation nucleus." This is the point that coincides with the center of the aforementioned rotation. Everything that is located between the viewer 20 and the nucleus of rotation 24 will be considered as a near-sight perception space, and everything located behind the nucleus of rotation in the gaze direction will be considered as a far-sight perception space.

Since when viewing circles at an angle, the circles are seen as ovals, as shown in FIG. 11, we will consider three ovals around the rotation nucleus 24, i.e., an outermost oval 26, an intermediate oval 28, and the innermost oval 30. It is understood that the intermediate oval 28 is located inside the outermost oval 26 and that the innermost oval 30 is located inside the intermediate oval 28.

Points B1, C1, and D1 are located on the outermost oval 26 in the near-sight space of the viewer's vision, while points F1, G1, and H1 are located in the far-sight space of the viewer's vision. Points A1 and E1, which are located on the outermost oval 26, are not seen because they are beyond the image-limiting window frame 22.

Points B2, C2, and D2 are located on the intermediate oval 28 in the near-sight space of the viewer's vision, while points F2, G2, and H2 are located in the far-sight space of the viewer's vision.

Points B3, C3, and D3 are located on the innermost oval 30 in the near-sight space of the viewer's vision, while points F3, G3, and H3 are located in the far-sight space of the viewer's vision.

Respective points A1 through E1, B2 through D2, and A3 through D3 correspond to different objects of observation, such as trees, houses, roads, parked cars, telegraph poles, etc. In the case considered with reference to FIG. 11, these objects are stationary with respect to each other, i.e., they are not moving as vehicles, motorcycles, etc.

When under the conditions shown in FIG. 11 the viewer 20 observes scenery limited by a window frame 22 (screen), he/she will see the objects in the foreground, i.e., objects B1, C1, D1, B2, C2, D2, B3, C3, and D3, passing by and turning in the counterclockwise direction, as shown in FIG. 11 by arrow V2, in oncoming movement (i.e., in the direction opposite to the car movement V1). The viewer sees objects in the background, i.e., objects F1, G1, H1, F2, G2, H2, F3, G3, and H3 located behind the rotation nucleus 24, as turning in the counterclockwise direction but moving in the same direction V3 as that of movement V1 (if the viewer 20 is looking through the right-side window, which in this case is shown as the window frame 22).

Figure 12:
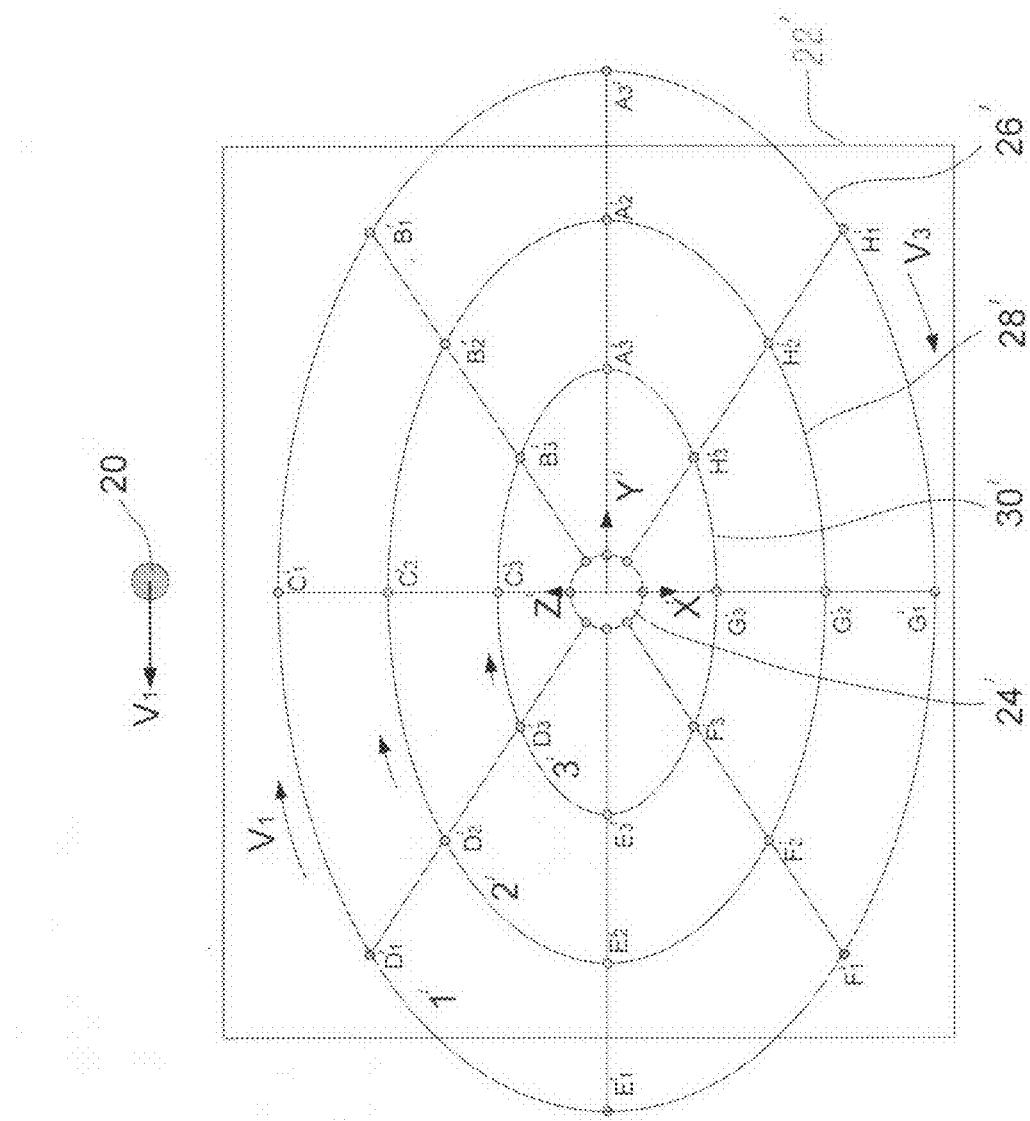
FIG. 12 is a schematic view that explains the principle of the present invention and illustrates a picture observed by a moving observer looking through a view-limiting object, e.g., a left car window.

FIG. 12 is similar to FIG. 11 except that it shows a view observed by the viewer 20 through the left-hand window frame 22'. When under the conditions shown in FIG. 12 the viewer 20 observes scenery that is limited by the window frame 22', he/she will see objects in the foreground, i.e., objects D1', C1', B1', D2', C2', B2', D3', C3', and B3', passing by and turning in the clockwise direction, as shown in FIG. 12 by arrow V2', i.e., in the oncoming direction of the car. On the other hand, objects F1', G1', H1', F2', G2', H2', F3', G3', and H3' located behind the rotation nucleus 24' are seen turning in the clockwise direction V3, and moving in the same direction as that of V1'.

Furthermore, it should be noted that the speed of the aforementioned rotation as it is seen by the observer will depend on such factors as speed of movement of the observer, speed of movement of the object if the object is a moving car, height of the observer's position over the object (above or below the horizon), position of the rotation nucleus relative to the observer, and the distance from the observer to the object. More specifically, irrespective of rotational direction, the closer the object is to the observer, the higher the speed of rotation seen by the observer. In other words, objects located in the near-sight perception space rotate at a higher speed than objects located in the far-sight perception space. For example, when the observer looks at the moon through the window of a train, he/she sees the moon as practically immobile, i.e., in the same position regardless of the speed of the train if the train moves without changing its direction. In any case, the linear speed $V_L$ of movement of an object will equal $V_L = R \cdot \omega$, where $\omega$ is frequency of rotation and R is distance from the viewer to the object.

In the present invention, the above-described principle is used to substantially correct the reproduction of moving spatial images on a flat screen. This is needed, e.g., in the production of animated cartoon films, video games, visual training programs, etc.

The method of the invention is carried out in the following manner. First, a scenario is written according to the selected animated cartoon, video game, visual training movie, etc. Let us assume that the scenario includes scenes with "n" predetermined objects A1, A2, ... B1, B2, ... etc., as shown in FIG. 11. In perception of a moving three-dimensional scene, the aforementioned objects A1, A2, ... B1, B2, ... etc., must be reproduced on a screen with movements relative to each other. In accordance with the inventors' concept, each current image of a moving three-dimensional scene with the selected objects is created according to the following procedure. First, a system of coordinate is selected, for example, a three-dimensional orthogonal coordinate system having axes X, Y, and Z, where the Z-axis is a vertical axis, and X- and Y-axes form a horizontal plane as viewed by the observer who may not necessarily be located in the X-Y plane and who may observe the scene at a certain angle to the horizontal plane. In other words, the viewer looks at the scene at a certain angle from above. It is understood that such a condition is conventional and the observer may observe the scene at any arbitrary angle, including a negative angle, i.e., from below the selected horizontal plane.

Following this, a scale is selected. For this purpose, the length of a known object, e.g., the average height of a human's body, is selected as a reference dimension needed for the scaling of dimensions of other objects shown in the picture. It is understood that reduction of this reference dimension corresponds to the distance from the viewer to the image of the reference object in a scene shown on the screen. The farther the distance is to the object from the viewer, the smaller is the size of the object, which, in this case, is determined by the laws of conventional geometry.

The next step is selection of a position for the aforementioned rotation nucleus 24, shown in FIG. 11, in the space that is still not limited by the screen and is placed into the center of the selected coordinate system X-Y-Z. It is understood, however, that the rotation nucleus 24 can be placed at any point on the line that passes from the viewer to the line of horizon. In the plane of the drawing in FIG. 11, axis X coincides with axis Z. Next to be selected is the required number of ovals with the center of each oval in the rotation nucleus 24, and then the three-dimensional space is divided into the near-sight space, which is located between the viewer and the rotation nucleus 24 and into the far-sight space, which is located behind the rotation nucleus 24. In the next step, the aforementioned objects are arranged on the respective ovals, the linear speed of movement of the three-dimensional speed to be shown on the screen is selected, and distances to the objects are determined. It is understood that the objects are placed on the scene before the ovals are drawn so that the ovals will pass through the objects. Next we determine frequencies of rotation of the ovals $\omega$ from formula $\omega=V/R$, where V is the assumed speed of movement of the three-dimensional scene reproduced on the screen, and R is the distance from the viewer to the object. Having selected and determined the aforementioned values, these values are then introduced into a known 3D-animation program as input data, e.g., into a program such as Amorphium, Art of Illusion, Poser, Ray Dream Studio, Bryce, Maya, Blender, TrueSpace, Lightwave, 3D Studio Max, SoftImage XSI, Alice, and Adobe Flash (2D).

To effect a 3D scene that is seen on the screen as moving from left to right, data entered into the computer software should reproduce the rotation of the objects in a counterclockwise direction so that the viewer sees objects A2, B2, C2 ... of the near-sight space in the oncoming direction, while objects H1, G1 ... located behind the rotation nucleus 24 are turning in the counterclockwise direction but are moving in the same direction as the scene on the screen.

Similarly, to effect a 3D scene that is seen on the screen as moving from right to left, the data entered into the computer software should reproduce the rotation of the objects in the clockwise direction so that the viewer sees objects A2', B2', C2' ... of the near-sight space in the oncoming direction, while objects H1', G1' ... located behind the rotation nucleus 24 are turning in the clockwise direction but are moving in the same direction as the scene on the screen.

Based on the input data, the software creates a film that contains a moving 3D scene with improved spatial perception of images on a flat screen.

If the moving 3D scene reproduced on a screen depicts an object that moves relative to other objects, e.g., a motorcycle moving in an arbitrary direction, the speed vector of the motorcycle is resolved into two components, one of which is directed perpendicular to the radius and the other along the radius. As a result, depending on the direction of movement of the motorcycle, the computer software either adds the perpendicular speed vector component to the speed vector V of the moving scene or subtracts the perpendicular speed vector from the speed vector V.

It is understood that the principle of the invention applies to a system wherein the number of aforementioned ovals can be chosen from at least two to an endless number and that the rotating nucleus 24 can be located at any point in the illustrated space from the nearest point C1 on the external oval 26 to the farthest point G1 on the external oval 26. It is also understood that the situation described above with reference to FIG. 11 relates to a single current exposure on the screen and that a film consists of a plurality of such exposures reproduced at least with a frequency of 8 and, preferably, at least 24 exposures per second.

The method of the invention is especially advantageous for reproducing moving 3D scenes on training simulators for drivers, pilots, etc., as well as on video game apparatuses with rapidly moving 3D scenes, etc.

Thus, it has been shown that the invention provides a method for correct reproduction of moving spatial images on a flat screen. The method is intended for computer-assisted production of animated cartoons, video games, etc., with enhanced three-dimensional features for improved visual perception of 2D pictures as 3D images. The method reproduces moving flat-screen images with improved spatial perception in a simple way by entering preselected data into conventional 3D-animation software suitable for use on a conventional personal computer.

Although the invention has been shown and described with reference to specific examples, it is understood that these examples should not be construed as limiting the invention and that any changes and modifications can be made with regard to materials, shapes, and other features of the illustrated embodiments without departure from the scope of the patent claims. For example, although an orthogonal coordinate system was described in connection with the invention, it is understood that a polar-coordinate system can be conveniently used for the purpose of obtaining software input data. The application of the method of the invention is not limited to video games, professional simulators, or animated cartoons. The software programs are not limited by those listed in the specification.

The invention claimed is:

1. A method for correct reproduction of moving three-dimensional scenes on a flat screen observed by a viewer, the method comprising the following steps: preparing a scenario and plurality of pictures depicting predetermined scenes at various times; selecting for each picture of a scene a plurality of objects according to the scenario; selecting for the aforementioned predetermined scenes a coordinate system X, Y, Z, where Z is the vertical axis, and X-Y axes form a horizontal plane; arranging the objects in the aforementioned scenes, drawing ovals that pass through each of the selected objects or several objects if they are located on the same oval, each oval representing a projection of a circle seen by the viewer at an angle to the X-Y plane; selecting a scale for scaling the sizes of objects; selecting a position for a rotation nucleus which is a point-of-gaze fixation on the X-Y plane; dividing the aforementioned area on the X-Y plane into a near-sight space, which is the space between the viewer and the rotating nucleus, and a far-sight space, which is the space behind the rotating nucleus; determining distances R from the viewer to the objects; selecting a linear speed V of movement of the aforementioned moving three-dimensional scenes on the screen; calculating the frequency of rotation ω for all ovals and hence for each object on each oval according to the formula ω=V/R; introducing the obtained values V, R, number of objects, positions of objects on the ovals, scale, and other selected values as input data into a conventional 3D-animation computer program; and creating a film for reproduction of spatially perceived moving scenes on a screen by creating a plurality of aforementioned pictures on the basis of the input data.

2. The method of claim 1, wherein during said movement of the aforementioned moving three-dimensional scenes, the objects located in the near-sight space rotate in the direction opposite the vector of aforementioned speed V and move in the direction opposite the vector of speed V, while the objects located in the far-sight space rotate in the same direction as the objects of the near-sight space but move in the direction that coincides with the vector of speed V.

3. The method of claim 2, wherein during movement of the aforementioned moving three-dimensional scene from right to left, the objects rotate in the counterclockwise direction.

4. The method of claim 2, wherein during movement of the aforementioned moving three-dimensional scene from left to right, the objects rotate in the clockwise direction.

5. The method of claim 3, wherein objects rotate with frequency of rotation ω, which is inversely proportional to distance R.

6. The method of claim 4, wherein objects rotate with frequency of rotation ω, which is inversely proportional to distance R.

7. The method of claim 1, wherein at least one object moves relative to other objects with a predetermined speed $V_m$.

8. The method of claim 7, wherein the vector of the aforementioned predetermined speed $V_m$ is resolved into a first component, which is perpendicular to the radius drawn from the viewer to the aforementioned at least one object and a second component directed along the radius, said components being added to the input data for a conventional 3D-animation computer program.

9. The method of claim 5, wherein at least one object moves relative to other objects with a predetermined speed $V_m$.

10. The method of claim 9, wherein the vector of the aforementioned predetermined speed $V_m$ is resolved into a first component, which is perpendicular to the radius drawn from the observer to the aforementioned at least one object and a second component directed along the radius, said component being added to the input data for a conventional 3D-animation computer program.

11. The method of claim 6, wherein at least one object moves relative to other objects with a predetermined speed $V_m$.

12. The method of claim 11, wherein the vector of the aforementioned predetermined speed $V_m$ is resolved into a first component, which is perpendicular to the radius drawn from the observer to the aforementioned at least one object and a second component directed along the radius, said component being added to the input data for a conventional 3D-animation computer program.

13. The method of claim 1, wherein the conventional 3D-animation computer program is selected from the group consisting of Amorphium, Art of Illusion, Poser, Ray Dream Studio, Bryce, Maya, Blender, TrueSpace, Lightwave, 3D Studio Max, and SoftImage XSI.

14. The method of claim 5, wherein the conventional 3D-animation computer program is selected from the group consisting of Amorphium, Art of Illusion, Poser, Ray Dream Studio, Bryce, Maya, Blender, TrueSpace, Lightwave, 3D Studio Max, and SoftImage XSI.

15. The method of claim 6, wherein the conventional 3D-animation computer program is selected from the group consisting of Amorphium, Art of Illusion, Poser, Ray Dream Studio, Bryce, Maya, Blender, TrueSpace, Lightwave, 3D Studio Max, and SoftImage XSI.

16. The method of claim 10, wherein the conventional 3D-animation computer program is selected from the group consisting of Amorphium, Art of Illusion, Poser, Ray Dream Studio, Bryce, Maya, Blender, TrueSpace, Lightwave, 3D Studio Max, and SoftImage XSI.

17. The method of claim 12, wherein the conventional 3D-animation computer program is selected from the group consisting of Amorphium, Art of Illusion, Poser, Ray Dream Studio, Bryce, Maya, Blender, TrueSpace, Lightwave, 3D Studio Max, and SoftImage XSI.

18. The method of claim 1, wherein the moving three-dimensional scene relates to a subject selected from a video game, animated cartoon, or simulator for the driver of a vehicle.

19. The method of claim 10, wherein the moving three-dimensional scene relates to a subject selected from a video game, animated cartoon, or simulator for the driver of a vehicle.

20. The method of claim 12, wherein the moving three-dimensional scene relates to a subject selected from a video game, animated cartoon, or simulator for the driver of a vehicle.

* * * * *